United States Patent
Avery, IV et al.

(10) Patent No.: US 6,976,269 B1
(45) Date of Patent: Dec. 13, 2005

(54) INTERNET CO-LOCATION FACILITY SECURITY SYSTEM

(75) Inventors: Albert M. Avery, IV, San Jose, CA (US); Jay Steven Adelson, San Francisco, CA (US); Derrald Curtis Vogt, San Jose, CA (US)

(73) Assignee: Equinix, Inc., Foster City, CA (US)

( * ) Notice: Subject to any disclaimer, the term of this patent is extended or adjusted under 35 U.S.C. 154(b) by 904 days.

(21) Appl. No.: 09/650,218

(22) Filed: Aug. 29, 2000

(51) Int. Cl.⁷ .......................... G06F 11/30; G06F 12/14; H04L 9/00; H04L 9/32
(52) U.S. Cl. ................. 726/2; 726/5; 726/17; 709/219; 709/217; 709/230; 709/328; 382/124; 382/188; 382/115; 340/825.31; 340/825.34; 340/5.5; 340/5.81; 340/5.82; 340/5.83; 340/5.85; 340/5.86; 49/68
(58) Field of Search ................................ 713/200, 201; 709/219, 217, 328, 224, 230; 382/124, 116, 382/188, 115; 340/825.31, 825.34, 5, 5.5; 346/541; 705/8, 9; 348/154, 159; 49/68

(56) References Cited

U.S. PATENT DOCUMENTS

| | | | |
|---|---|---|---|
| 4,689,610 A | * | 8/1987 | Dietrich ....................... 340/515 |
| 5,517,185 A | * | 5/1996 | Acimovic et al. .......... 340/5.33 |
| 5,541,585 A | * | 7/1996 | Duhame et al. ............ 340/5.62 |
| 5,903,225 A | * | 5/1999 | Schmitt et al. ............. 340/5.25 |
| 5,915,973 A | * | 6/1999 | Hoehn-Saric et al. ........ 434/350 |
| 6,097,429 A | * | 8/2000 | Seeley et al. ................ 348/154 |
| 6,160,903 A | * | 12/2000 | Hamid et al. ................ 382/115 |
| 6,281,790 B1 | * | 8/2001 | Kimmel et al. ............. 340/506 |
| 6,353,853 B1 | * | 3/2002 | Gravlin ........................ 709/219 |
| 6,370,582 B1 | * | 4/2002 | Lim et al. .................... 709/230 |
| 6,389,454 B1 | * | 5/2002 | Ralston et al. .............. 709/204 |
| 6,477,434 B1 | * | 11/2002 | Wewalaarachchi et al. ... 700/83 |
| 6,496,595 B1 | * | 12/2002 | Puchek et al. ............... 382/124 |
| 6,591,242 B1 | * | 7/2003 | Karp et al. ..................... 705/2 |
| 6,614,450 B1 | * | 9/2003 | Vossler ........................ 715/751 |
| 2002/0029349 A1 | * | 3/2002 | Daigneault et al. ......... 713/200 |

OTHER PUBLICATIONS

Trane, Tracer Summit, Building Automation System, BAS-PRC001-En, Aug. 2003, 20 pages.

* cited by examiner

Primary Examiner—Christopher Revak
Assistant Examiner—Shin-Hon Chen
(74) Attorney, Agent, or Firm—Blakely Sokoloff Taylor & Zafman LLP

(57) ABSTRACT

An Internet co-location facility security system integrates all the major components of the system and makes tracking information from these components available to co-located members on a database accessible from the web. A web-based interface allows co-located members to assign visitor access to the Internet co-location facility through the Internet from remote computer terminals. A visitor access and enrollment system allows a visitor to enroll only once in the system to be granted access to one or more other Internet co-location facility security systems around the globe.

21 Claims, 8 Drawing Sheets

HIGH LEVEL DETAIL OF SECURITY SYSTEM

| Contact ID | Contact Name | Company | Access |
|---|---|---|---|
| 2050 | Derrald Vogt | Supermac | No Escort |

| | Case ID | Company | Reason For Visit | Person Assigned | Date | Time |
|---|---|---|---|---|---|---|
| ☑ | 2738-1 | Supermac | Schedule work visit | Puncinello Caruso | 5/22/00 | 8:00:00 AM |
| ☐ | 2739-1 | Supermac | Schedule work visit | Puncinello Caruso | 1/10/00 | 10:00:00 AM |
| ☐ | 2740-1 | Supermac | Schedule work visit | Puncinello Caruso | 1/9/00 | 6:00:00 AM |
| ☐ | 2744-1 | Supermac | Schedule work visit | Puncinello Caruso | 5/20/00 | 1:00:00 PM |
| ☐ | 2745-1 | Supermac | Schedule work visit | Puncinello Caruso | 6/11/00 | 8:00:00 AM |
| ☐ | 2754-1 | Supermac | Schedule work visit | Puncinello Caruso | 2/20/00 | 6:00:00 PM |

[ Next Window ]

FIG. 5

INTERNET CO-LOCATION FACILITY SECURITY SYSTEM

FIELD OF THE INVENTION

The present invention relates generally to the field of security systems and, more particularly, to an Internet co-location facility security system.

BACKGROUND

The growing use of the Internet by businesses around the globe is creating a need for a scalable and secure home for every organization with a mission critical Internet component. Various facilities exist to provide Internet Service Providers (ISPs), Application Service Providers (ASPs), and content providers with a safe place to house their hardware.

In a typical co-location model, member sites are placed in an environment where they have access to a network provider, site management and web hosting arrangements, and other similar types of services. While co-location models expedite electronic transmissions, the clustering of member sites in these facilities makes them vulnerable to vandals, thieves, and even terrorist attacks. Because modern e-commerce companies moving billions of dollars over the Internet can not afford to jeopardize the physical security of their equipment, co-location facilities are generally protected by advanced security systems. For instance, video cameras record activity in and around the facilities, sensors, including motion and sound sensors, detect suspicious or uncharacteristic events, and computers located in security control centers monitor access points. These systems may also include magnetic card readers or similar electromagnetic locking devices granting member users access to certain parts of the facilities or to individually locked cages configured for networking and/or server co-location.

Unfortunately, in the security conscious world of the Internet, the security systems of the prior art have many limitations. For one, they do not provide co-located members with enough control. Although these systems are designed to track everyone in a co-location facility at all times, members do not have access to this information. Keeping this information private may work in hospitals or jails, for example, but it does not provide enough leverage to e-commerce companies whose businesses depend on the facility in which their equipment is placed being absolutely free from interruption of service (power, air conditioning, the interconnections themselves, etc.). In addition, under current co-location security systems, members are unable to schedule visitor access to the facility through a user interface connected to the World Wide Web. This lack of automated access poses an additional security risk because it allows security officers, rather than the members themselves, to have too much control regarding visitor access to co-located member sites in the facility. Moreover, the security systems of the prior art are not completely integrated. Tracking information from all the various components of the system is not available on a centralized database accessible by co-located members. Finally, visitors to one co-location facility do not have access to other co-location facilities owned by the same organization without having to go through a lengthy visitor enrollment system which is both burdensome and costly in the fast-paced world of e-commerce.

Therefore, there is a need for an Internet exchange security system that is both completely integrated and that is also able to be monitored and access controlled by co-located members of the facility. There is also a need for a more efficient co-location facility visitor access and enrollment system.

SUMMARY OF THE INVENTION

It is an object of the present invention to provide a security system for an Internet co-location facility that integrates all the major components of the system and that makes the tracking information from these components available to co-located members on a master database accessible from the web. It is a further object of the present invention to provide a web-based interface that allows co-located members to assign visitor access to the Internet co-location facility from remote locations anywhere in the world. It is still a further object of the present invention to provide a visitor access and enrollment system that allows the visitor to enroll only once on the system to be granted access to one or more other Internet co-location facilities around the globe.

According to one aspect of the present invention, there is provided a security system to control, monitor, and track security integrity and events within an Internet co-location facility. The security system may be installed at the Internet co-location facility and linked to a corporate server through a Wide Area Network (WAN). In the preferred embodiment of the present invention, a co-located member schedules a visit to the Internet co-location facility from a computer terminal located at a remote site using a web-based Customer Care System (CCS). Contact information, visit information, and the like is entered by the co-located member through the web-based interface and is transmitted by the CCS via the Internet to a Customer Support and Customer Relationship Management (CRM) system located on the corporate server that stores and manages this information in a database. The CCS also assigns a visit identification number for the scheduled visit and transmits this information to the CRM as well. The CRM opens a file in the database which stores the information about the co-located member and the nature of the scheduled visit.

When the visitor arrives at the Internet co-location facility, one of two procedures may be followed. If the visitor is already enrolled at the Internet co-location facility, the visitor may use a biometrics hand reader and input the visitor identification code into a key pad or similar type of alphanumeric input device coupled to the biometrics hand reader. If the biometrics hand reader verifies that the hand profile and visitor identification code match a profile for a visitor enrolled at the Internet co-location facility, an access control system connected by a private security network to the front entrance biometrics hand reader allows the visitor to enter the Internet co-location facility. If there is no match, access is denied.

The use of the front entrance biometrics hand reader also triggers a software action in a Customer Security System (referred to as the Equinix Security System (ESS)) which includes a central processing unit (CPU) connected by the private security network to the access control system and to the lobby workstation. The ESS provides the lobby workstation (which may be monitored by a security officer) with picture and identification information for the visitor, a list of open and scheduled cases associated with the visitor, and specific security levels for the visitor. The visitor may then use a plurality of biometrics hand readers and input the visitor identification code into the key pad or similar type of alphanumeric input device coupled to each of the plurality of biometrics hand readers to move throughout the Internet co-location facility to an appropriate cage where the co-located member's Internet access unit and other equipment may be housed. After the visitor performs work or some other type of function in the cage, the visitor returns to the lobby using the plurality of biometrics hand readers.

If the visitor is not already enrolled at the Internet co-location facility another aspect of the present invention allows for a visitor access and enrollment procedure. According to this aspect of the present invention, visitor identification information (i.e., hand profiles for the plurality of biometrics hand readers, photo identification for the access control system, and additional identification information) is gathered by an enrollment biometrics hand reader and the access control system and is transmitted to the plurality of biometrics hand readers, the ESS, and to the CRM database which is located on the corporate server coupled to the Internet co-location facility through the WAN. The visitor identification information may then be transmitted to the ESS and to a plurality of biometrics hand readers and access control systems at one or more other Internet co-location facilities through the WAN. In this manner, the visitor need only enroll once in the Internet co-location facility security system to be granted access to any other Internet co-location facility around the globe.

In a further aspect of the present invention, the events of the visit may be monitored by co-located members of the Internet co-location facility. The access control system tracks the visitor's use of the plurality of biometrics hand readers and transmits this information to the ESS. The ESS, in turn, transmits the information to the CRM which makes the information available in almost real-time to co-located members through the CCS web-based interface. In this way, co-located members may monitor the visitor's location within the Internet co-location facility at all times.

BRIEF DESCRIPTION OF THE DRAWINGS

The present invention is illustrated by way of example, and not limitation, in the figures of the accompanying drawings in which like reference numerals refer to similar elements and which:

FIG. 5 is a sample Case Assignment computer user interface screen as it appears on a lobby workstation of an Internet co-location facility security system in accordance with one embodiment of the present invention.

DETAILED DESCRIPTION

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
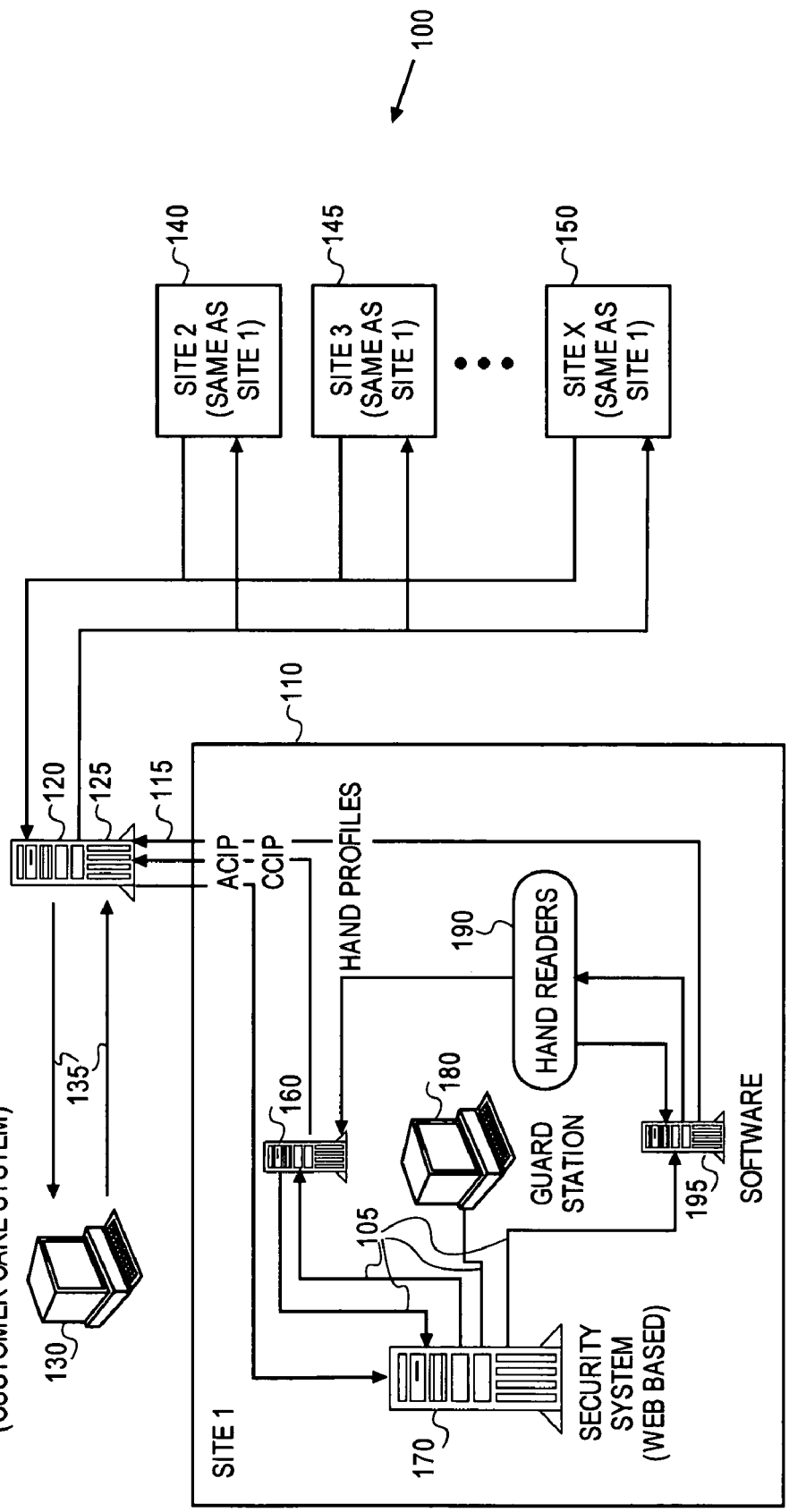
FIG. 1 is a functional block diagram illustrating the overall operation of an Internet co-location facility security system in accordance with one embodiment of the present invention.

Referring now to FIG. 1, there is shown a functional block diagram illustrating the overall operation of an Internet co-location facility security system 100 in accordance with one embodiment of the present invention. The Internet co-location facility 110 itself may include a facility comprising a plurality of cabinets located in shared or private cages (not shown in this view). Each cabinet is an enclosed frame or cage into which equipment may be mounted. The cabinets may be configured in full spaces (for example 36" deep by 22" wide by 83" tall) and are designed so that co-located members of the Internet co-location facility 110 may house Internet access units and other types of equipment (not shown in this view). A plurality of network providers (not shown in this view) may be connected to the co-located member's equipment. It should be noted, however, that the Internet co-location facility security system 100 of the present invention may be used in numerous types of co-location models and other types of facilities with high-level security system requirements.

Figure 8:
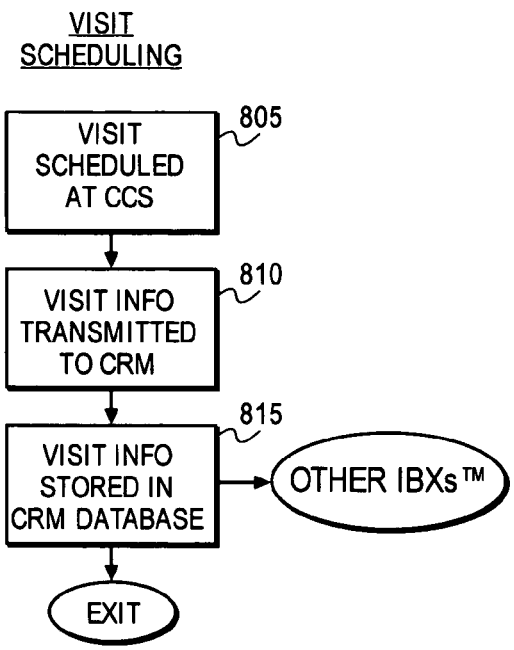
FIG. 8 is a flow diagram illustrating the process by which a co-located member may schedule a visit to an Internet co-location facility using an Internet connection to a database located on a server of an Internet co-location facility security system in accordance with one embodiment of the present invention.

The Internet co-location facility security system 100 may be installed at the Internet co-location facility 110 and linked to a corporate server 125 through a Wide Area Network (WAN) 115. In the preferred embodiment of the present invention, a co-located member may use a remote computer terminal 130 to schedule a visit to the co-located member's cage within the Internet co-location facility 110. Using a web-based Customer Care System (CCS) accessible from the remote computer terminal 130, the co-located member may schedule the visit by entering information into the CCS regarding the date, time, duration, and nature of the visit, etc. See also FIG. 8 (processing block 805). The visit information is then transmitted via the Internet 135 to a Customer Support and Customer Relationship Management System (CRM) 120 located on the corporate server 125 connected by the WAN 115 to the Internet co-location facility 110

(processing block 810). The CRM 120 includes a database to store and manage the visit information in a file particular to the co-located member who scheduled the visit (processing block 815). However, it should be noted that while the file that is opened by the CRM 120 is particular to the co-located member who scheduled the visit, any visitor who is authorized to access the Internet co-location facility 110 by the co-located member and by the Internet co-location facility security system 100 may make the scheduled visit. Every scheduled visit may be referred to as a case in the Internet co-location facility security system 100 and appears as a case assignment in the CRM 120 database indicating information such as a visit identification number for the visit, expected visitor name, co-located member name, date, time, duration, and nature of the visit, etc. The CRM 120 transmits the case assignment through the WAN 115 to the Customer Security System (referred to as the Equinix Security System (ESS)) 170 which includes a central processing unit (CPU) to store the case assignment.

Figure 9:
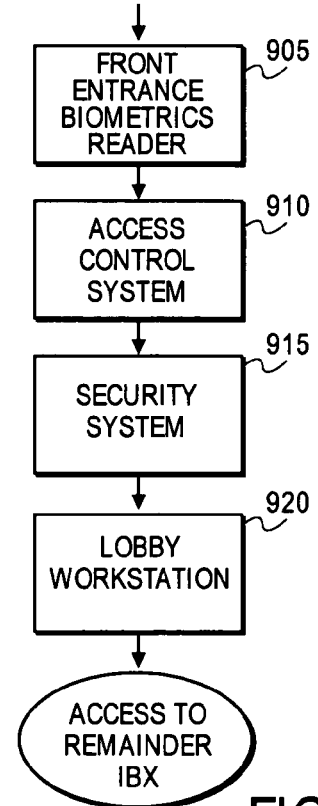
FIG. 9 is a flow diagram illustrating the process by which an enrolled visitor is granted access to an Internet co-location facility using a front entrance biometrics reader of an Internet co-location facility security system in accordance with one embodiment of the present invention.

When the visitor arrives at the Internet co-location facility 110 for the scheduled visit, one of two procedures may be followed depending upon the visitor's enrollment status at the Internet co-location facility 110. If the visitor is already enrolled at the Internet co-location facility 110 (i.e., if the visitor has visited the Internet co-location facility 110 or another Internet co-location facility 140, 145, 150, etc., at least once), the visitor may use a conventional biometrics hand reader (not shown in this view) controlled by software 195 and enter a visitor identification code particular to the visitor into a key pad or similar type of alphanumeric input device coupled to the front entrance biometrics hand reader. See also FIG. 9 (processing block 905). It should be noted that every time the visitor uses one of the plurality of biometrics hand readers 190 located in the Internet co-location facility 110, the visitor must also enter the visitor identification code into a key pad or similar type of alphanumeric input device coupled to each of the plurality of biometrics hand readers 190. It should also be noted that although biometrics hand readers are used in the preferred embodiment of the present invention, other types of conventional personal characteristics scanners may be used as well including knuckleprint, fingerprint, and retinal scanners. Other types of electronic locking devices may also be used.

If the front entrance biometrics hand reader verifies that the hand profile and visitor identification code match a previously learned code for the visitor in the Internet co-location facility 110 security system, an access control system 160 (processing block 910) including a central processing unit (CPU) and a plurality of intelligent control units (not shown in this view) connected to the front entrance biometrics hand reader by a private security network 105 (and also to the plurality of other biometrics hand readers 190 by the private security network 105) allows the visitor to access the Internet co-location facility 110. If there is no match, access is denied. In the preferred embodiment of the present invention, a conventional AMAG access control system 160 is used, but other types of access control systems may be used as well.

The access control system 160 is connected by the private security network 105 to the ESS 170 (processing block 915). Under the direction of executing software programs, the ESS 170 receives information regarding the use of the front entrance biometrics hand reader from the access control system 160. This information may include the visitor identification code, the date and time the visitor used the front entrance biometrics reader, the visitor's picture, and the visitor's name. The ESS 170 combines the information received from the access control system 160 with the case assignment information received from the CRM 120 and transmits this information to a browser-based (i.e. web-based) interface connected by the private security network 105 to a lobby workstation 180 (processing block 920). In this manner, a security officer monitoring the lobby workstation 180 may identify which case the visitor is assigned to and authorize visitor access to the rest of the Internet co-location facility 110. The ESS 170 will track the visitor and update the case assignment as the visitor uses the plurality of biometrics hand readers 190 throughout the Internet co-location facility 110.

Figure 2:
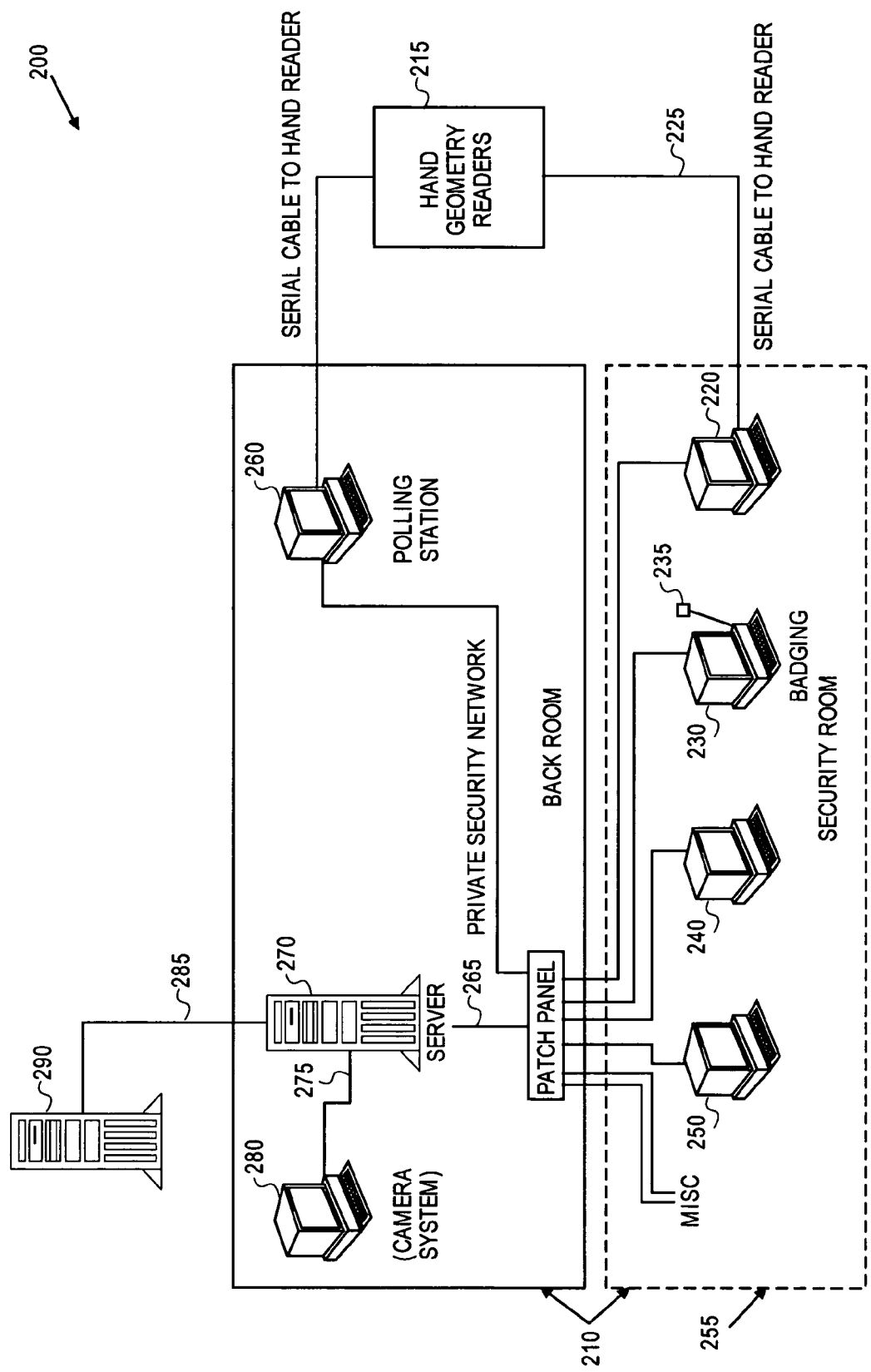
FIG. 2 is a functional block diagram illustrating the network detail of the access and enrollment components of an Internet co-location facility security system in accordance with one embodiment of the present invention.
Figure 9A:
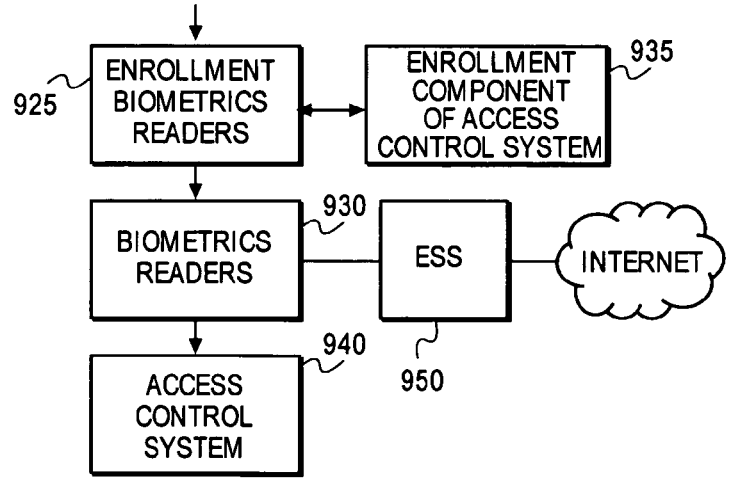
FIG. 9A is a flow diagram illustrating the process by which a visitor may be enrolled in an Internet co-location facility security system using an enrollment biometrics reader connected to the access control system and to the plurality of biometrics readers in accordance with one embodiment of the present invention.

Referring now to FIG. 2, there is shown a functional block diagram illustrating the network detail of the access and enrollment components of the Internet co-location facility security system 200 in accordance with one embodiment of the present invention. According to this aspect of the present invention, a first time visitor to the Internet co-location facility 210 may be enrolled in the Internet co-location facility security system 200 by the software 220 that controls the biometrics hand readers 215. See also FIG. 9A. In operation, the visitor's hand may be placed in a measuring platen in an enrollment biometrics hand reader (processing block 925) located in the security room 255 of the Internet co-location facility 210. An image of the hand may be recorded using an electronic imaging device and stored on a memory chip or storage device in the enrollment biometrics hand reader. Comparison means function to match the stored hand features with the visitor identification code which may be entered into the enrollment biometrics hand reader through the key pad or similar type of alphanumeric input device coupled to the enrollment biometrics hand reader. A cable 225 transmits this information to the plurality of biometrics hand readers 215 located in the Internet co-location facility 210 (processing block 930). The plurality of biometrics hand readers 215 may also be connected by the cable 225 to a polling station component 260 of the access control system (processing block 940). The polling station 260 transmits activity to a server 270 which permits or denies access to designated areas in the Internet co-location facility 210 based on information received from the plurality of biometrics hand readers 215.

The visitor may also be enrolled on the access control system. Visitor enrollment information may be entered on a computer terminal component 250 of the access control system (processing block 935). This information may include the visitor identification code, the visitor's name, co-located member access authorization levels, and the like. A CPU contains the software to control the access control system and is connected to the computer terminal component 250 of the access control system by the private security network 265. A badge making system 230 may also be connected to the access control system by the private security network 265 and makes a badge for the visitor containing the visitor's identification information and access authorization levels transmitted by the access control system to the plurality of biometrics hand readers 215 by the private security network 265. The computer terminal component 250 of the access control system prints out a badge for the visitor based on information received from the badge making system 230 through the private security network 265. The badge making system may also contain a camera system 235 to take a picture of the visitor to store in the badge making system 230 for future use. It should be noted that a second camera system 280 connected to server 270 by connection 275 monitors activity throughout the Internet co-location facility 210. However, second camera system 280 is not actually a part of the Internet co-location facility 210 enrollment procedure.

In the embodiment of the present invention represented by FIG. 2, the server 270 also contains the software to control the ESS (processing block 950). The visitor's hand profile from the enrollment biometrics hand reader and the enrollment information from the access control system is downloaded to the ESS. The ESS transmits this information through the WAN 285 to the CRM 290. The WAN 285 may allow the CRM 290 to transmit the information from the ESS to one or more CRM's and access control systems and to a plurality of biometrics hand readers in one or more other Internet co-location facilities (shown in this view). In this manner, the visitor need only enroll once in the Internet co-location facility security system 200 (or in another initial visit Internet co-location facility security system) to be granted access to any other Internet co-location facility throughout the world.

Moreover, once the visitor is enrolled in the Internet co-location facility security system 200, the ESS may combine visitor information received from the access control system through the private security network 265 with case assignment information received from the CRM 290 through the WAN 285 and transmit the combined information to a browser-based interface connected by the private security network 265 to a lobby workstation 240. As is discussed in the description of FIG. 1, in this manner a security officer monitoring the lobby workstation 240 may identify which case a visitor is assigned to and authorize the visitor with access to the rest of the Internet co-location facility 210.

Figure 3:
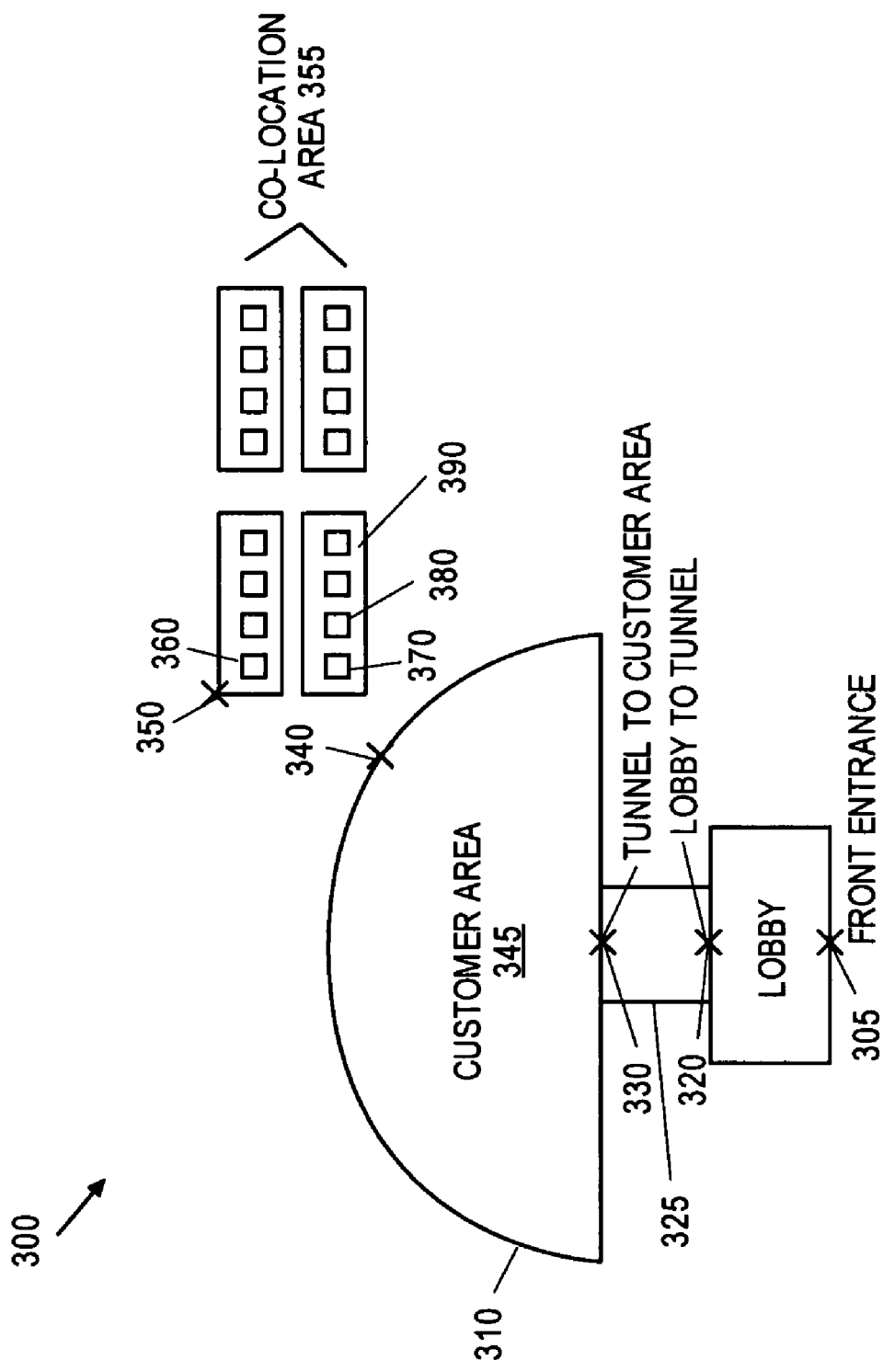
FIG. 3 is a functional block diagram illustrating the design layout of the primary access points in an Internet co-location facility security system in accordance with one embodiment of the present invention.

Referring now to FIG. 3, there is shown a functional block diagram illustrating the primary access points in the Internet co-location facility security system 300 in accordance with one embodiment of the present invention. Once the visitor is granted access to the Internet co-location facility 310 and, if necessary, enrolled in the Internet co-location facility 310 security system, the security officer may activate a user interface function by, for example, selecting a button appearing on the lobby workstation (not shown in this view) that says "Start Visit." At this point, the visitor may use a second biometrics hand reader 320 and enter the visitor identification code into the key pad or similar type of alphanumeric input device coupled to the second biometrics hand reader 320. If the second biometrics hand reader 320 verifies that the visitor's hand profile matches the visitor identification code, the access control system (not shown in this view) permits the visitor to enter the tunnel 325 area of the Internet co-location facility 310. If the second biometrics hand reader 320 does not find a match for the visitor's hand profile and the visitor identification code, an alarm may be set off in the Internet co-location facility 310 and remedial action will be taken.

If there is a match, the visitor may use the third, fourth, and fifth biometrics hand readers 330, 340, and 350, respectively, located at designated access points in the Internet co-location facility 310. A match on these biometrics hand readers allows the visitor to enter the customer area 345, the co-location area 355, and the cage 350 where the visitor is scheduled to make a visit to one or more cabinets 370, 380, 390, etc. It should be noted, however, that although the visitor uses a total of five biometrics hand readers (four biometrics hand readers 320, 330, 340, and 350 located in the facility and a front entrance biometrics hand reader 305) in the embodiment of the present invention represented by FIG. 3, any number of biometrics hand readers may be used in the Internet co-location facility 310 security system.

As the visitor uses the plurality of biometrics hand readers 320, 330, 340, and 350, the access control system (not shown in this view) tracks the visitor's progress throughout the Internet co-location facility 310, storing the visitor identification code, the visit identification number, and the date and time the visitor used any one of the plurality of biometrics hand readers 320, 330, 340, and 350. In addition, the ESS (not shown in this view) may download the tracking information stored in the access control system and transmit this information through the WAN to the CRM (not shown in this view). The CRM may make this information available through the Internet in almost real-time to co-located members using the CCS web-based interface (not shown in this view). In this manner, co-located members may monitor the location of the visitor in the Internet co-location facility 310 at any given point in time.

Figure 4:
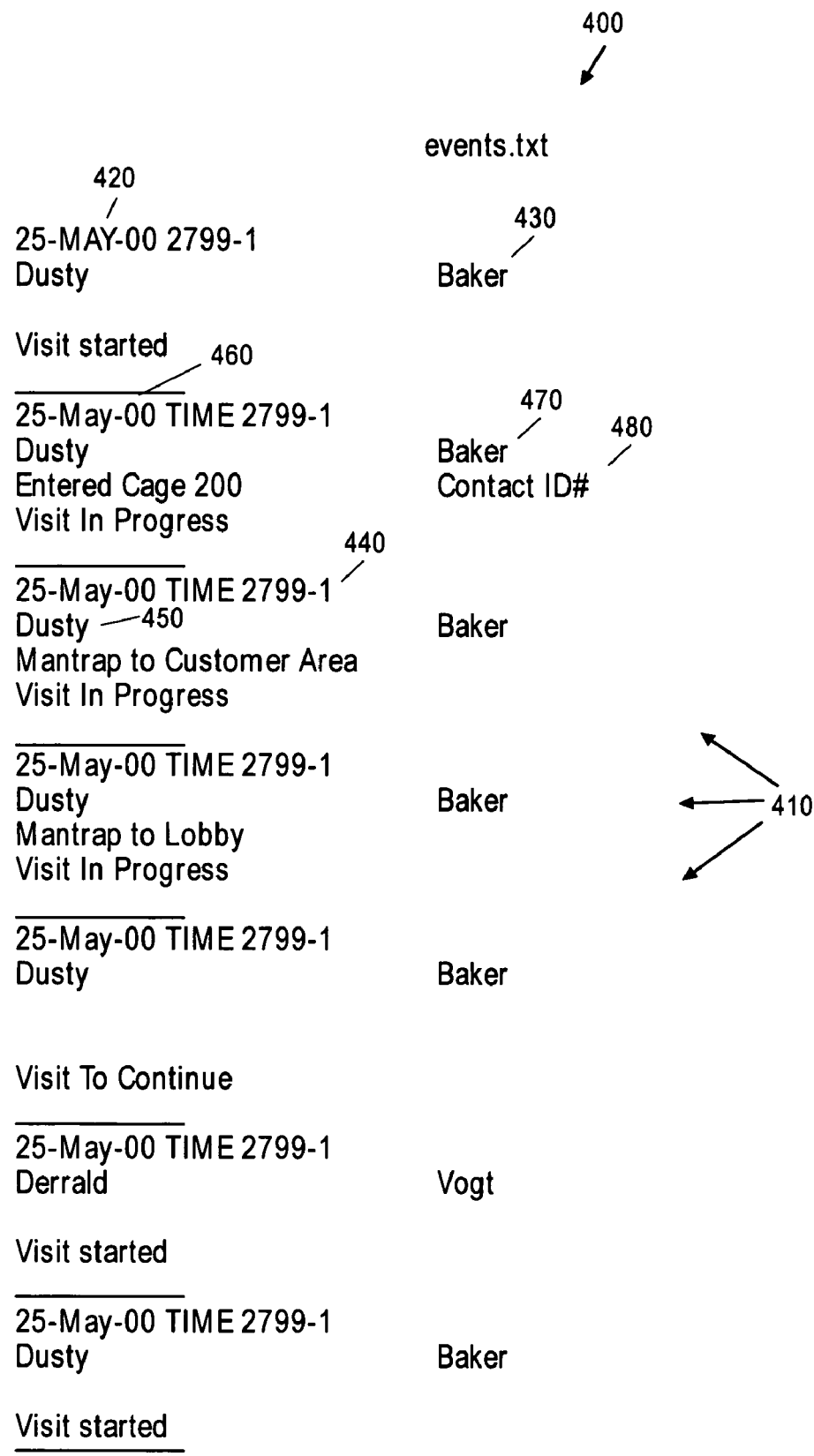
FIG. 4 is a sample Visit-in-Progress computer user interface screen that co-located members may download from a CCS web-based interface component of an Internet co-location facility security system in accordance with one embodiment of the present invention.

Referring now to FIG. 4, there is shown a sample Visit-in-Progress computer user interface screen 400 that co-located members may view from the CCS web-based interface in accordance with one embodiment of the present invention. The information appears in columns 420 and 430 on the screen 410. The visit identification number 440, the visitor's first name 450, and the date and time 460 the visitor entered a particular designated area in the Internet co-location facility appears in the left hand column 420, and the visitor's last name 470 and the visitor identification code 480 appears in the right hand column 430. This information is updated in almost real-time whenever the visitor uses one of the plurality of biometrics hand readers located in the Internet co-location facility.

Referring now to FIG. 5, there is shown a sample Case Assignment computer user interface screen 500 as it appears on the Internet co-location facility lobby workstation in accordance with one embodiment of the present invention. The visitor identification code, the visitor's name, the company (co-located member), and the access authorization level appears in columns at the top of the screen. The visit identification number, the company (co-located member), the reason for the visit, the name of the person who scheduled the visit, and the date and time of the visit appear in columns below the visitor information. The visitor may indicate to a security officer monitoring the lobby workstation the visit identification number assigned to the visitor for a particular case.

Figure 6:
FIG. 6 is a sample Visit-in-Progress computer screen that is maintained in a database of an Internet co-location facility security system in accordance with one embodiment of the present invention.

Referring now to FIG. 6, there is shown a sample Visit-in-Progress computer screen 600 that is maintained in a database of an Internet co-location facility security system in accordance with one embodiment of the present invention. The visitor identification code 610, the visit identification number 620, the visitor's first name 630, middle initial 640, and last name 650, and the company 660 (co-located member) appear in columns on the screen. As is illustrated by the Visit-in-Progress screen 600, more than one visitor may be assigned to a particular case. In addition, the Visit-in-Progress screen 600 demonstrates that the system matches the visitor identification code 610 with the visit identification number 620.

Figure 7:
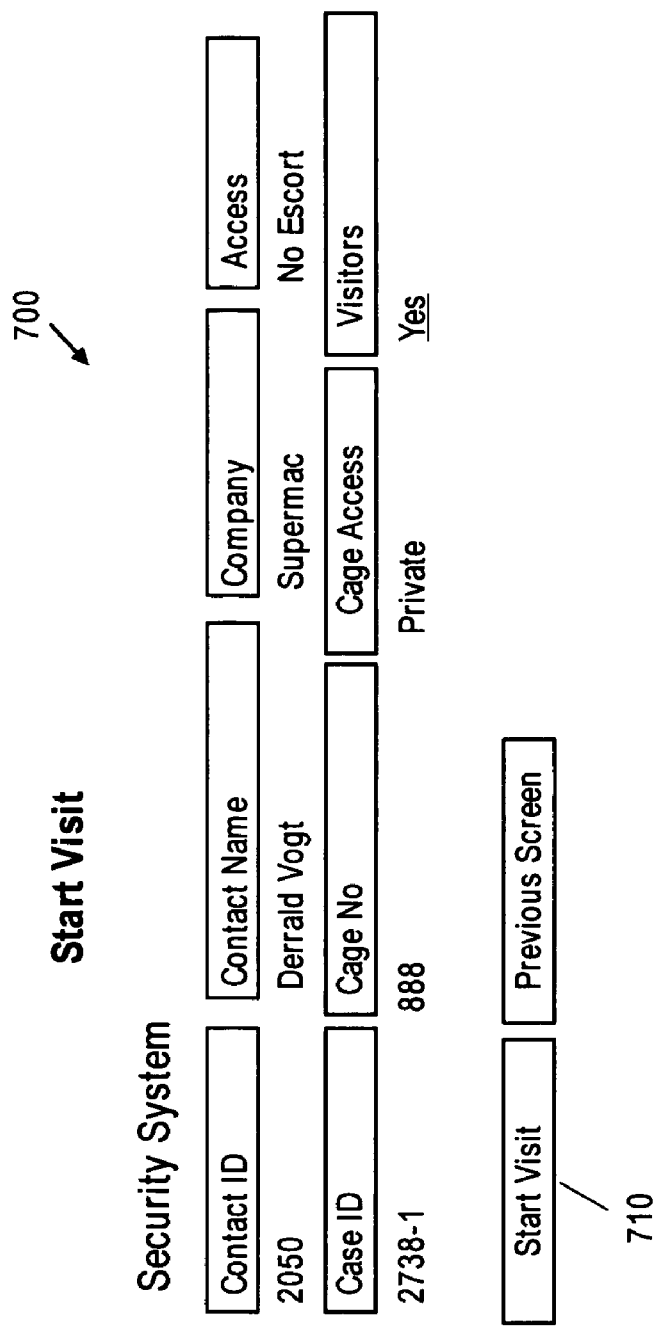
FIG. 7 is a sample Start Visit computer user interface screen as it appears on a lobby workstation of an Internet co-location facility security system in accordance with one embodiment of the present invention.

Referring now to FIG. 7, there is shown a sample Start Visit computer user interface screen 700 as it appears on the lobby workstation in accordance with one embodiment of the present invention. A security officer monitoring the lobby workstation may click on a "Start Visit" box 710 on the screen with a mouse or some other type of control device to authorize the visitor to access the remainder of the Internet co-location facility. The visitor may then use the plurality of biometrics hand readers to access designated areas within the Internet co-location facility. When the visitor completes the scheduled visit and returns to the lobby, a screen with an "End Visit" box (not shown in this view) will appear on the lobby workstation. The security officer may click on the "End Visit" box to end the visit. It should be noted, however, that if more than one visitor is assigned for the scheduled visit, a case assignment will remain open and still appear on the lobby workstation as a visit-in-progress for one or more other visitors assigned to the case.

Thus, an Internet co-location facility security system has been described. Although the foregoing description and accompanying figures discuss and illustrate specific embodiments, it should be appreciated that the present invention is to be measured only in terms of the claims that follow.

What is claimed is:

1. An Internet co-location facility security system, comprising:
   a plurality of biometrics readers;
   an access control system coupled to the plurality of biometrics readers;
   a computer including a central software program connected to the access control system, the central software program configured to monitor the use of the plurality of biometrics readers;
   a server including a database connected to the central software program, the database configured to receive information from the central software program regarding the use of the plurality of biometrics readers by a visitor associated with a co-located member during a visit to the co-location facility, the server further configured to transmit this information through the Internet to a web-based interface;
   the web-based interface further configured to allow the co-located member, or the visitor associated with the co-located member, to schedule the visit to the co-location facility via the Internet; and
   an input device coupled to each of the plurality of biometrics readers for entry of a visitor identification code of the visitor, wherein the access control system is configured to allow the visitor to gain access to designated areas in the facility upon a match between the visitor's identification code and the visitor's personal identification characteristics.

2. The Internet co-location facility security system of claim 1 wherein the access control system further includes a transmitter to transmit the information regarding the use of the plurality of biometrics readers to the central software program, the information regarding the use of the plurality of biometrics readers including the visitor identification code and the date and time the visitor used one or more of the plurality of biometrics readers.

3. The Internet co-location facility security system of claim 1 wherein information regarding the scheduled visits transmitted by the co-located members through the Internet to the database on the server includes the date, time, expected duration of a scheduled visit, and a visit identification number for the scheduled visit.

4. The Internet co-location facility security system of claim 1 wherein the server further includes a transmitter to transmit information regarding the scheduled visits to the central software program through a network.

5. The Internet co-location facility security system of claim 1 further including a front entrance biometrics reader for initial access to the facility, upon initial use at the front entrance the biometrics reader configured to trigger the central software program to transmit information regarding the use of the front entrance biometrics reader to a lobby workstation.

6. The Internet co-location facility security system of claim 1 further including a user interface to trigger the central software program to combine a visitor identification code with a visit identification number for the scheduled visit.

7. The Internet co-location facility security system of claim 6 wherein the user interface authorizes a visitor to progress through the remainder of the facility using the plurality of biometrics readers.

8. The Internet co-location facility security system of claim 1 wherein information regarding the use of the plurality of biometrics readers is transmitted by the central software program through the network to the database on the server, the information including a visitor identification code, a visit identification number for the scheduled visit, and the date and time a visitor used any one of the plurality of biometrics readers.

9. The Internet co-location facility security system of claim 8 wherein the co-located members may access the information in the database regarding a visitor's use of the plurality of biometrics readers by using the web-based interface accessible from one or more remote computer terminals connected to the Internet.

10. An Internet co-location facility security system, comprising:
    an enrollment biometrics reader;
    an enrollment system to enroll a first time visitor, the enrollment system including an input device coupled to the enrollment biometrics reader and configured to match a stored image of a personal characteristic corresponding to the first time visitor to an identification code entered into the enrollment biometrics reader and associated with the first time visitor, wherein the first time visitor is a non-enrolled co-located member, or a non-enrolled visitor associated with the non-enrolled co-located member;
    an access control system coupled to the enrollment biometrics reader and to a plurality of other biometrics readers;
    a computer including a central software program connected to the access control system, the central software program configured to monitor the use of the plurality of other biometrics readers;
    a server including a database connected to the central software program, the database configured to receive information from the central software program regarding the use of the plurality of biometrics readers by an enrolled co-located member or an enrolled visitor associated with a co-located member during a visit to the co-location facility, the server further configured to transmit this information through the Internet to a web-based interface; and
    the web-based interface further configured to allow either the enrolled or non-enrolled co-located member, or the enrolled or non-enrolled visitor associated with the enrolled or non-enrolled co-located member, to schedule the visit to the co-location facility via the Internet.

11. The Internet co-location facility security system of claim 10 further including an imaging device to record an image of a personal characteristic of the non-enrolled co-located member, or the non-enrolled visitor associated with the non-enrolled co-located member, the image of the personal characteristic stored on a storage device associated with the enrollment biometrics reader.

12. The Internet co-location facility security system of claim 11 wherein the enrollment biometrics reader transmits a stored image matched with a visitor identification code to the plurality of other biometrics readers located in the facility through a private security network.

13. The Internet co-location facility security system of claim 10 including an input device coupled to the access control system and configured to allow a visitor to enroll in the access control system by entering visitor information into the input device.

14. The Internet co-location facility security system of claim 10 wherein a stored image matched with a visitor identification code from the enrollment biometrics reader and identification information from the access control system is download by the central software program, the central software program configured to transmit the information through the Internet to the database on the server.

15. The Internet co-location facility security system of claim 14 wherein the server is further configured to transmit the information from the central software program through a network to another database on another server in one or more other co-location facilities.

16. The Internet co-location facility security system of claim 15 wherein the server is further configured to transmit the information through the network to an access control system and through a private security network to a plurality of biometrics readers in one or more other co-location facilities, the information transmitted by the database to automatically enroll the visitor on the access control system and the plurality of biometrics readers in the one or more other facilities.

17. An Internet co-location facility security system, comprising:
   a plurality of biometrics readers;
   an access control system coupled to the plurality of biometrics readers;
   a computer including a central software program connected to the access control system, the central software program configured to monitor the use of the plurality of biometrics readers by a visitor, wherein the visitor is a co-located member, or a visitor associated with the co-located member;
   a web-based interface communicatively coupled to the computer and configured to allow the visitor to schedule a visit to the co-location facility through the Internet, wherein the visitor is a first time visitor or a previously enrolled visitor; and
   an enrollment system to enroll the first time visitor, the enrollment system including an imaging device configured to match a stored image of one or more personal characteristics corresponding to the first time visitor to an identification code unique to the first time visitor and entered into an enrollment biometrics reader.

18. The Internet co-location facility security system of claim 17 further including a server communicatively coupled to a database, the server further communicatively coupled to the central software program, the server configured to receive information from the central software program regarding the use of the plurality of biometrics readers by the visitor and to transmit this information to the co-located member through a network.

19. The Internet co-location facility security system of claim 17 further including an input device coupled to each of the plurality of biometrics readers and configured to receive input pertaining to a visitor identification code of a the visitor, wherein a match between the visitor identification code and the visitor's personal identification characteristics trigger the access control system to allow the visitor to gain access to designated areas in the co-location facility.

20. The Internet co-location facility security system of claim 17 wherein the access control system further includes a transmitter to transmit the information regarding the use of the plurality of biometrics readers to the central software program, the information regarding the use of the plurality of biometrics readers including a visitor identification code and the date and time the visitor used one or more of the plurality of the biometrics readers.

21. The Internet co-location facility security system of claim 17 wherein the central software program is configured to combine a visit identification number with the information regarding the use of the plurality of biometrics readers from the access control system, the combined information transmitted to the database on the server where it is accessible to co-located members from one or more remote computer terminals connected to the Internet.

* * * * *